(12) United States Patent
Buck et al.

(10) Patent No.: US 12,093,378 B2
(45) Date of Patent: Sep. 17, 2024

(54) CALENDAR-BASED DEVICE SECURITY

(71) Applicant: Lookout Inc., San Francisco, CA (US)

(72) Inventors: Brian James Buck, Livermore, CA (US); Tyler Croak, Columbia, MD (US); Krishna Sathyanarayana, Bengaluru (IN)

(73) Assignee: LOOKOUT INC., Boston, MA (US)

( * ) Notice: Subject to any disclaimer, the term of this patent is extended or adjusted under 35 U.S.C. 154(b) by 0 days.

(21) Appl. No.: 18/074,763

(22) Filed: Dec. 5, 2022

(65) Prior Publication Data

US 2024/0078310 A1  Mar. 7, 2024

(30) Foreign Application Priority Data

Sep. 2, 2022  (IN) .............................. 202221050287

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ...................................................... G06F 21/554
USPC ............................................................ 726/23
See application file for complete search history.

(56) References Cited

U.S. PATENT DOCUMENTS

| 10,720,029 | B1 * | 7/2020 | Mears | ................. | A61B 5/1176 |
| 2016/0255139 | A1 * | 9/2016 | Rathod | ............. | H04N 1/32101 |
| | | | | | 709/203 |

\* cited by examiner

*Primary Examiner* — Anthony D Brown
(74) *Attorney, Agent, or Firm* — David R. Stevens; Stevens Law Group (57) ABSTRACT

Events of a calendar are identified and evaluated for confidentiality due to an explicit tag, location, participants, or subject matter. In response, permissions of applications on a device are dynamically reduced. Permissions may include permissions to access sensors such as a microphone and camera. Sensors of other devices such as a voice-processing device or Bluetooth device may be disabled. The risk associated with applications on a device may be evaluated based on permissions, usage, collected data, cloud service provider, location, permissions and usage of other users of the application, and other attributes of the application. The risk may be represented as a risk score used to determine whether to perform a mitigation action.

16 Claims, 5 Drawing Sheets

CALENDAR-BASED DEVICE SECURITY

CROSS-REFERENCE TO RELATED APPLICATION

This application claims the benefit of Indian Provisional Application Serial No. 202221050287, filed Sep. 2, 2022, which is hereby incorporated herein by reference in its entirety.

BACKGROUND

In a modern enterprise, there is a wide array of devices in use by members of the enterprise, all of which may store or generate sensitive data. It is in the interest of the enterprise to protect the security of its data on each device on which it may be found. However, some devices may also be used for personal matters by a member of the enterprise or while the member of the enterprise is conducting personal matters.

Accordingly, there is a need to balance the need for security with protection of privacy.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Objective-C, Swift, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The following description provides an approach for protecting privacy in a dynamic and context sensitive way. In particular, events in a calendar or other events may require enhanced privacy that would otherwise be too restrictive and inconvenient. Events are detected and privacy is dynamically enhanced in various ways with the enhancement to privacy being removed following the event, when those privacy enhancements are no longer needed.

Figure 1:
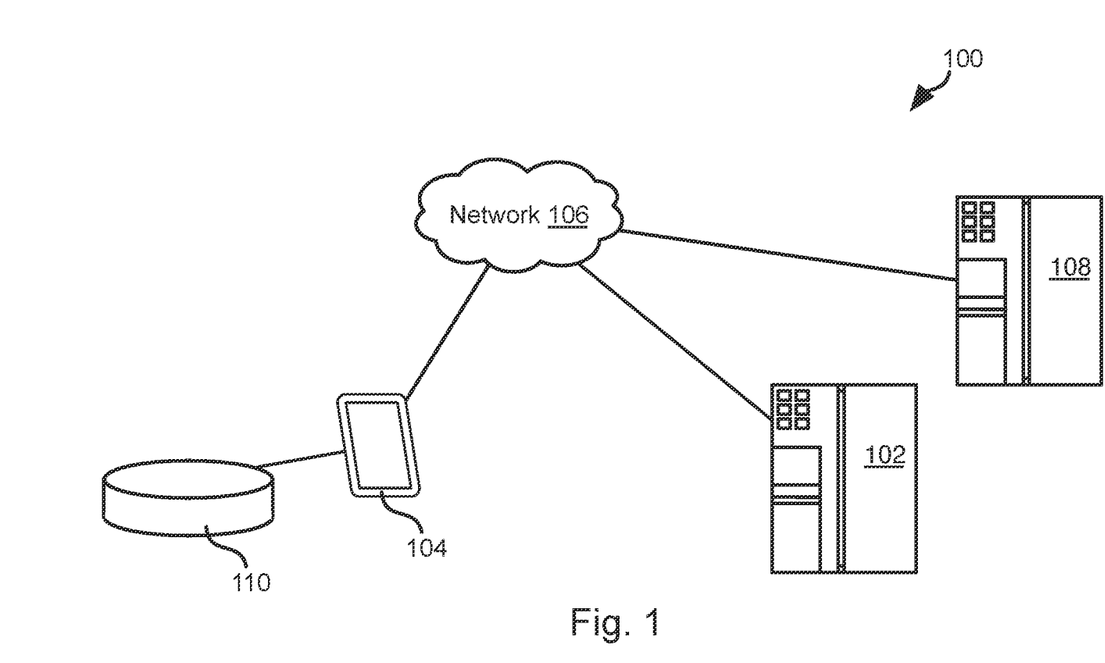
FIG. 1 is a schematic block diagram of a network environment for performing methods in accordance with an embodiment of the present invention.

FIG. 1 illustrates a network environment 100 of an enterprise in which the systems and methods disclosed herein may be implemented. The network environment 100 may include a server system 102 that includes one or more computers.

Members of the enterprise may use various user devices 104 that may be embodied as mobile phones, tablet computers, laptop computers, desktop computers, wearable computers, personal digital assistants (PDA), electronic book or book reader, digital camera, digital video camera, video game console, voice processing device or executable in a device (voice controlled, voice transcribing, voice recording, voice recognizing, etc.), drone, unmanned aerial vehicle (UAV), robot, robotic appliance, smart television, set top box, router, cable modem, ambient computing device (located in a mostly fixed location and available to multiple users located in the vicinity of the device, e.g. a smart room), a computing device embedded in a vehicle (automobile, plane, etc.), ingestible or body-implanted devices, smart fabrics or clothing, or other computing devices.

The systems and methods disclosed herein are particularly applicable where at least a portion of the devices 104 are mobile and can be expected to change location over time. The mobile devices 104 may execute a mobile operating system. Mobile devices can also include devices in automobiles, planes, or other vehicles, such as an embedded computing or communication system that communicates via the Internet over a cellular phone system or Wi-Fi or other communications technologies, or other portable computing devices (e.g., devices that pair with a mobile device using Bluetooth, such as an Apple watch).

One will appreciate that the mobile devices 104 described herein may include any computer or computing device running an operating system for use on handheld or mobile devices, such as smartphones, PDAs, tablets, mobile phones and the like. For example, a mobile device may include devices such as the Apple iPhone®, the Apple iPad®, or any device running the Apple iOS™, Android™ OS, Google Chrome™ OS. As used herein, the mobile communication device may also be referred to as a mobile computing device, a mobile client, or simply, as a device or as a client.

The user devices 104 may also be desktop computers or other server computers executing an operating system. User devices can include devices such as a smartphone, a laptop computer, a desktop computer, a mobile device, a wearable computing device, a personal digital assistant (PDA), a tablet computer, an electronic book or book reader, a digital camera, a video camera, a video game console, a voice processing device or executable in a device (voice controlled, voice transcribing, voice recording, voice recognizing, etc.), a drone, a UAV, a vehicle, a personal robot, a robotic appliance, a smart TV, a set top box, a router, a cable modem, a tablet, a server, a thing in IoT, an ambient computing device (located in a mostly fixed location in a room or location, available to multiple users located in the vicinity of the device, smart rooms, etc.) and/or any other suitable computing device.

The devices 104 may interact with the server system 102 by way of a network 106, such as a local area network (LAN), wide area network (WAN), the Internet, or any other type of wired or wireless network connection (e.g., 2G, 3G, 4G, 5G). Mobile devices 104 may communicate via the Internet over a cellular data network, WI-FI or other communications technologies, or other portable computing devices (e.g., devices that pair with a mobile device using BLUETOOTH, such as a smart watch).

A user device 104 may be connected to one or more "internet of things" (IoT) devices 110 by means of a short range (e.g., BLUETOOTH) wireless connection or by connecting to a same local area network (LAN), WI-FI network, or other type of network connection. An IOT device may be embodied as a voice processing device or executable in a device (voice controlled personal assistant (VCPA), voice transcribing device, voice recording device, voice recognition device, etc.), appliance (refrigerator, washing machine, etc. having wireless communication capabilities), or other device. An IoT device 110 can have various sensors and computing and communication capabilities and can run applications. An IoT device 110 may have capabilities similar to a mobile device 104.

The server system 102 may function as a security server implementing security policies in cooperation with the user device 104. The server system 102 may implement one or more enterprise services, such as file servers, database servers, or other custom server applications performing functions specific to the enterprise. The user device 104 may further access other services provided by a server system 108 of a third party for personal use or for the benefit of the enterprise.

Figure 2:
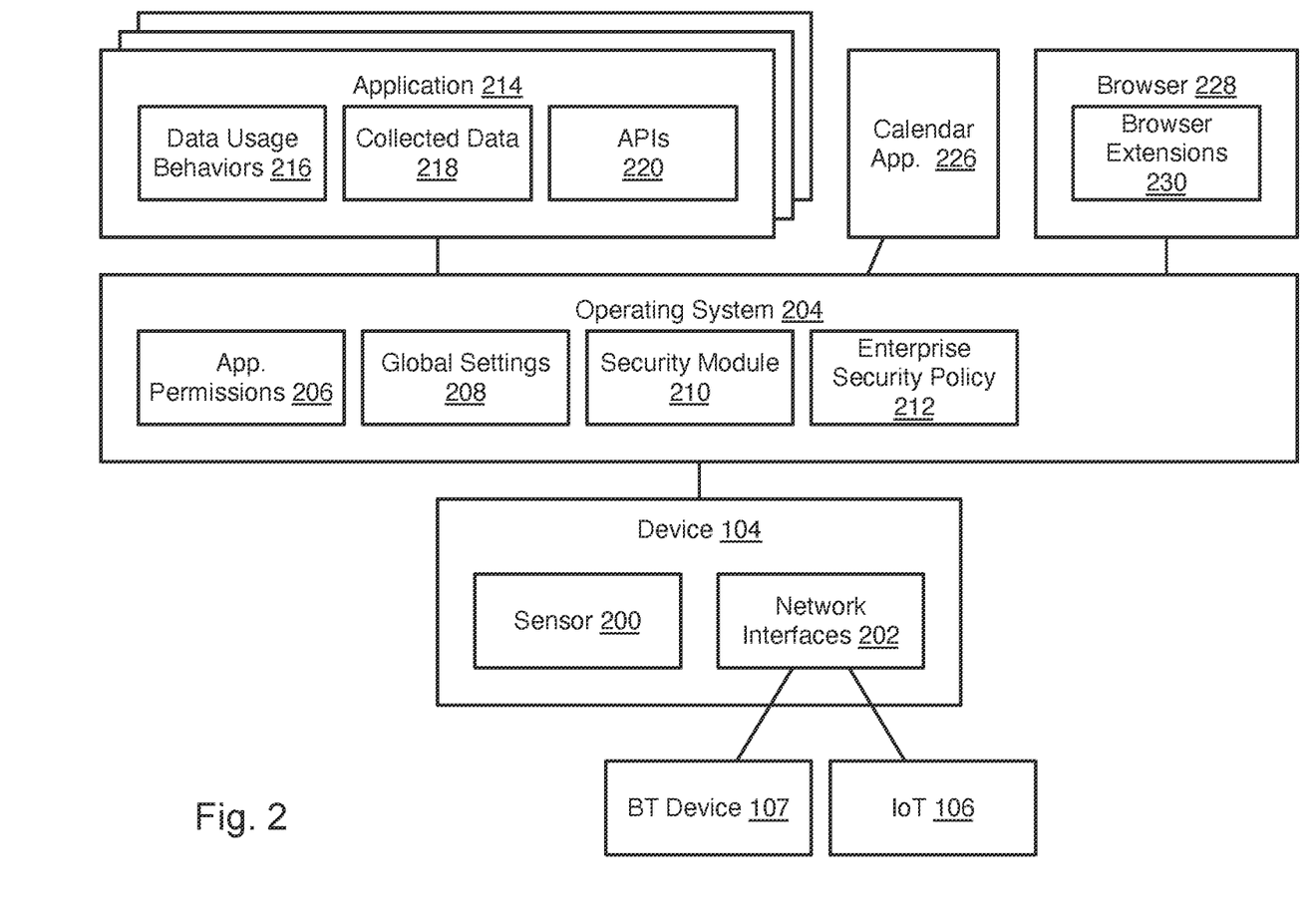
FIG. 2 is a schematic block diagrams of a components on a computing device protected in accordance with an embodiment of the present invention.

Referring to FIG. 2, a device 104 may include one or more sensors 200, such as a microphone, camera, an inertial measurement unit (IMU), an accelerometer, a gyroscope, a compass, a magnetic field measurement sensor, an orientation sensor, a global positioning system (GPS) receiver, a near field communication transceiver, fingerprint scanner, heart rate sensor, or other type of sensor. The sensors 200 may include sensors of a connected device, such as a fitness tracker, smart watch, or other device, or the sensors of a device which is not connected but is in physical proximity of a user. The device 104 may further include one or more network interfaces 202 for communicating with other devices, such as communicating using BLUETOOTH protocol with a BLUETOOTH device 107 or communicating with an IoT device 110 using a wireless or wired connection.

The device 104 may execute an operating system 204, such as WINDOWS, MACOS, LINUX, IOS, ANDROID, or the like. The operating system 204 may store permissions 206 granted by a user of the device 104 to applications 214 executing on the device. The application 214 may include an application used to conduct meetings and other applications that may have their corresponding permissions 206 modified as described herein to prevent collection of audio, video, or other data during a meeting or other events deemed confidential and handled as described herein.

The permissions 206 may include permissions to access specific sensors 200, permission to use one or more network interfaces, permission to access or control one or more aspects of the operating system 204, or the like. The operating system 204 may include global settings 208. The global settings 208 may include security settings for the device 104 or for accessing and controlling functions of the operating system 204 itself.

The operating system 204 may include (natively or by modification) a security module 210. The security module may 210 may implement a security policy, such as an enterprise security policy 212. The security module may ensure that permissions granted by the operating system 204 and access to sensitive data (such as data and applications of an enterprise) are performed in accordance with the security policy 212. In some embodiments, the security module 210 is mobile device management (MDM) installed on the device 104. In some other embodiments the security module 210 may reside in a cloud (a public or private cloud), or the security module 210 may have a component which resides on the device and a component which resides in the cloud, where the components are communicating with each other to perform detection of events and to perform resulting actions.

The operating system may initiate operation of applications 214 in response to user inputs and manage the operation of the application 214, including providing functions and libraries used by the applications 214 to access the memory, storage, processors (see FIG. 6 and associated description) as well as the sensors 200 and network interfaces 202.

The applications 214 may be programmed to implement data usage behaviors 216 with respect to user data stored in the memory or storage of the device 104, the sensors 200 and/or the network interfaces 302. The application 214 may further accumulate collected data 218, such as within files created by the application 214. The application 214 include or be configured to use application programming interfaces (API) 220 from third parties. Each API 220 provides functions that may be called by the application 214.

A calendar application 226 may execute on the device 104. The calendar application 226 may be a native application to the operating system 204 or a third party application executing on the operating system 204 and include functions such as receiving meeting definitions (some or all of a title, date, time, and location for a meeting), generating alerts to remind a user of scheduled meetings, generating invitations to meetings, and performing any other functions performed by a calendar application as known in the art.

The browser 228 may execute on the device 104. The browser 228 may request webpages, receive webpages, render webpages, and execute code embedded in webpages. The browser 228 may be implemented as MICROSOFT EDGE, SAFARI, CHROME, FIREFOX, or other type of browser. The browser 228 may execute one or more browser extensions 230. Each browser extension 230 may be an executable that may be used by the browser 228 to process objects included in webpages.

Figure 3:
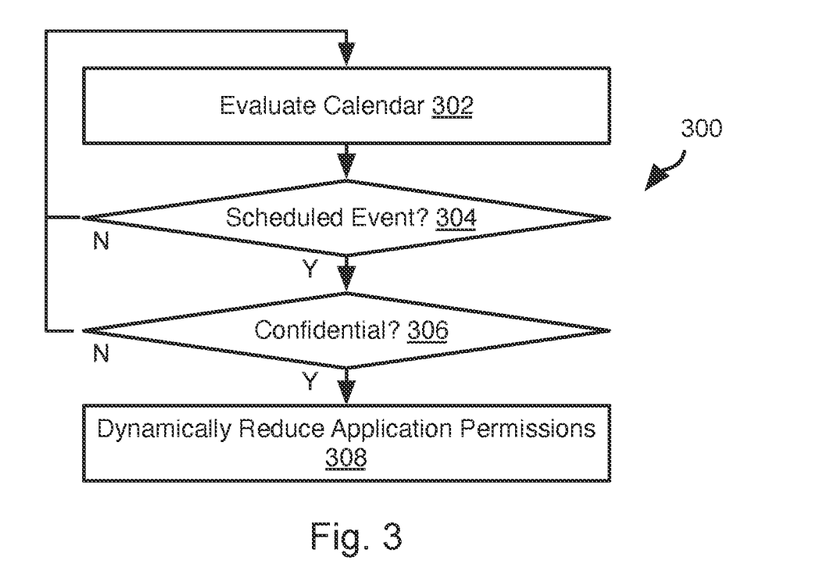
FIG. 3 is a process flow diagram of a method for implementing calendar-based device security in accordance with an embodiment of the present invention.

Referring to FIG. 3, the illustrated method 300 may be executed to provide calendar-based security. The method 300 may be executed by the security module 210 according to the enterprise security policy 212.

The method 300 may include evaluating 302 a calendar, such as a calendar managed by a calendar application 226, a web-based calendar accessed from the enterprise server system 102 or third-party server system 108, or other calendar. Evaluating 302 the calendar may include evaluating events of the calendar having a date and/or time within a window including following the time of execution of the method 300.

If an event is found 304 to be scheduled in the window, the method 300 may include evaluating 306 whether the event is confidential. Whether an event is confidential may be determined in various ways. All events of a particular calendar (e.g., a enterprise calendar for the user or a group to which a user belongs) may be deemed confidential. All events having a certain user identifier (e.g., email, phone number, name, employee identifier, etc.) or group identifier associated therewith (e.g., as a participant or organizer) may be deemed confidential. All events having a particular telephone number (e.g., conference call-in number) may be deemed confidential. All events having a particular keyword ("patent," "sensitive," "secret," etc.) may be deemed confidential. An event may have a flag set indicating that the event is confidential. Certain geographic regions, such as an enterprise facility, may be deemed confidential such that, if a location associated with an event is within such a geographic region, the event is deemed confidential. These are just examples of how to determine the confidentiality of an event may be determined. Events having confidentiality determined according to an alternative approach may also be processed according to the method 300.

The illustrated approach of detecting confidential events as described with respect to steps 302-306 is exemplary only. Other approaches may also be used. For example, voice keyword detection may be performed on an audio feed of an event. In the event that one or more confidentiality-indicating keywords ("patent," "sensitive," "secret," etc.) are detected, the event may be determined 306 to be confidential. In another example, a user may interact with a user interface element to flag an event is confidential.

If an event is found 306 to be confidential, the method 300 may include dynamically reducing 308 application permissions during the event, i.e. the duration of the event following the start time of the event. Following completion of the event, the application permissions may be dynamically restored to the state of the application permissions before dynamic reduction at step 308. Dynamically reducing 308 application permissions may begin before the start time of the event and continue after the duration of the event has lapsed in order to provide additional safeguards. For example, reducing 308 application permissions may begin X minutes before the start time and continue until Y minutes after the end time of the event, where X and Y are predetermined time values, e.g., 10 minutes. As used in the following description "application" may be understood as referring to an application 214, the browser 228, and browser extensions.

Note that the inverse of the described method 300 may be performed: an application, such as one used for the meeting, may have reduced permissions during a time window including an event and be granted increased permissions (e.g., access to a camera and microphone for conducting a video conference) during the time window. The time window may include the duration of the event and possibly transition periods before and after the duration of the event.

Whether the method 300 is performed may be conditioned on configuration parameters, such as configuration parameters of the security module 210, enterprise security policy 212, or other settings. The device 104 may therefore be configured by the configuration parameters to implement the method 300, or not, depending in the content of the configuration parameters.

In some instances, dynamically reducing 308 application permissions may fail for various reasons, such as the security module 210 not obtaining permissions to modify one or more applications. In such instances, the method 300 may include outputting a warning to a user of the device 104 indicating that this failure occurred, e.g., "The permissions of one or more applications have not been turned off." The warning may be in the form of a voice prompt, displayed text or image, or some other form. In some instances, the event may automatically be canceled, e.g., access to video conferencing application denied, in response to this failure, such as an event flagged as having a degree of confidentiality that cannot be allowed to proceed without performing step 308 with respect to application permissions.

The method 300 may be performed with respect to multiple devices these may include a device used to conduct the event (e.g., executing a videoconferencing application used during the event) and other devices that are not used to conduct the event but are one or both of (a) associated with an attendee (user account) and (b) located within a degree of proximity (same room, same WI-FI network, predefined radius, etc.) of the device used to conduct the event.

Figure 4:
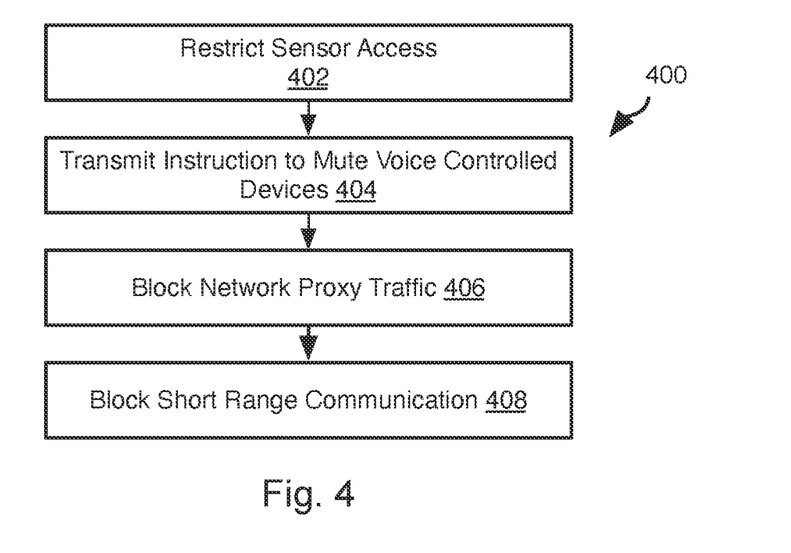
FIG. 4 is a process flow diagram of a method for increasing device security in accordance with an embodiment of the present invention.

FIG. 4 illustrates an example method for reducing application permissions during a confidential event. The method 400 may be executed by the security module 210 according to the enterprise security policy 212. Step 308 may include performing the method 400.

The method 400 may include restricting 402 access to one or more of the sensors 200. The one or more sensors for which access is restricted 400 may be used during the confidential event ("used sensors"), such as a microphone and a camera. Other sensors that are not required may be completely disabled, turned off, or otherwise made unavailable.

Access to the used sensors and possibly the unused sensors by applications may be restricted in various ways. The security module 210 may change the application permissions 206 for the applications to remove any access to the used sensors (and possibly the unused sensors) and restore any access removed after the confidential event is over. The security module 210 may modify, replace, or move one or more executable files, functions, or other modules of the applications, or the configuration or settings of the application used to access the used and possibly the unused sensors. The application or its configuration or its settings, or a combination of these, may be temporarily modified before the confidential event and the modification reversed after the confidential event. The temporary modification can consist of the security module communicating directly with an application on a device, via defined wireless communication protocols, or via the emission of instructive audio commands (e.g., "Alexa, stop listening"), or via indirect communication with a cloud service which controls the application configuration or settings or combination thereof, for the application on the device. The temporary modification followed by reversal of the modification may include any of uninstalling and reinstalling, changing a configuration of the application and then reversing the change in configuration, changing a setting of the application and then reversing the change in setting, performing an update on the application and reversing the update, or other temporary change and reversal of the change. The security module 210 may modify one or executable files, functions, or other modules of the applications to replace references to functions of the operating system with inoperable functions, the functions of the operating system performing access to the used sensors and possibly the unused sensors. In the case where there is an application (the listening application) which could capture the audio or video or screen or window contents or network traffic being sent from the device which is being used for the communication or collaboration meeting, the security module 210 may make any of the above modifications for that listening application, or additionally, may take one or more of the following actions: terminate the execution of the listening application, ensure that the listening application does not restart during the meeting, and optionally restart the listening application after the meeting has finished; prevent the listening application from communicating over a network, using a network proxy resident on the same device as the listening application or resident elsewhere in the cloud, by blackholing the communication. Blackholing, in this case, means that the listening application sees that its communication over the network is stopped, discarded, dropped, and is not successful. Watermarking of audio and/or video data of the confidential event may be performed. The actions performed by the security module 210 on a device used to conduct a confidential event (e.g., execute audio and/or video communication software used during a confidential event) may be performed in a like manner with respect to other applications and devices capable of recording audio or video of the event.

For browser extensions 230, restricting 402 access to the sensors 200 may include restricting all access by the browser. Alternatively, the security module 210, or an agent of the security module 210 implemented as an extension 230, may restrict access by the browser extensions 230 using the approach described above for restricting access by other applications.

The method 400 may include transmitting 404 an instruction to one or more other devices to mute the microphones thereof, such as an IoT device 110 or BLUETOOTH device 107, ultrawideband (UWB) device, or other type of device. The transmitting 404 may occur by a direct communication to the device, or indirectly by a communication to a cloud service which controls the device; in that instance, the cloud service then performs a communication with the device. The one or more other devices may be identified by referring to a profile of the user, e.g. reading a listing of devices that have been authenticated with respect to an account of a user or have accessed an account of the user in the past. The instruction may be in the form of a human audible instruction output by the device 104, an instruction input to a companion application for controlling the device 110, 107 that is executing on the device 104, emitting an inaudible signal from a speaker of the device 104 that prevents intelligible detection of conversation by a microphone of the device 110, 107, or other interaction with the device 110, 107 to prevent a microphone, camera, or other sensor thereof from detecting the confidential event.

For example, transmitting 404 the instruction may additionally or alternatively include outputting an audible command ("Alexa", "OK Google") for waking a voice-controlled device and detecting, e.g., with a microphone, whether an audible response is received from the voice-controlled device. In the event that a response is received, the user may be instructed to turn off the microphone of the voice-controlled device. In an alternative, the security module may emit an audio command with instructions for the device to stop listening, e.g., "Alexa, mute yourself" In an embodiment, the security module 210 continues to monitor the audio and can detect an audible command which attempts to wake the device up again to listen; in which case the security module may reissue the audio mute command, or may provide instruction or coaching to the user to please mute that device. E.g., as soon as the meeting commences, the security module may issue commands (audio commands, or commands over the network directly or indirectly) to the device to mute, e.g., emitting audio "Alexa, mute yourself"

In yet another alternative, a device 110, 107 may be integrated with the calendar application 226, such as by interacting with a server system hosting a calendar that is also accessed by the calendar application. Accordingly, the device 110, 107 may itself perform the method 300 to detect a confidential event and restrict access to the device 110, 107, such as a microphone or camera of the device 110, 107.

The method 400 may include blocking 406 traffic. For example, the device 104 may function as, or provide an interface for controlling, a proxy server for network traffic from a device 110, 107. As such the device 104 may block network traffic from each device 110, 107 during the confidential event. A proxy server has network traffic directed or routed to go through the proxy server before being passed along to any other network destination. The proxy server can actually run as a process on an individual device being used for the confidential event, or it can be a network gateway or router (located at the location of the user or located in the cloud) which receives all network communications from the location of the user. A proxy server may operate as a forward proxy or a reverse proxy. A forward proxy acts as an intermediary between the individual device and servers accessed by the individual device. A reverse proxy is associated with a server and receives requests addressed to the server and forwards the requests to the server. In either case, the security module can instruct the proxy server to not pass along (to "black hole") communication from a particular device during the confidential event.

The method 400 may include blocking 408 short range communication. This may include turning off BLUETOOTH (where not needed during the confidential event) to prevent access by an application to audio, video, or other data captured by a device 110, 107. This may include jamming the short range communication, e.g., by emitting radio frequency noise in the frequency band used for the short range communication (BLUETOOTH, UWB, NFC). Short range communication can include radio frequency based communications, or visible or near visible frequency communications (e.g., infrared communications), or sound communications. The actions of turning off or jamming communication may be taken for any of these communication technologies.

Figure 5:
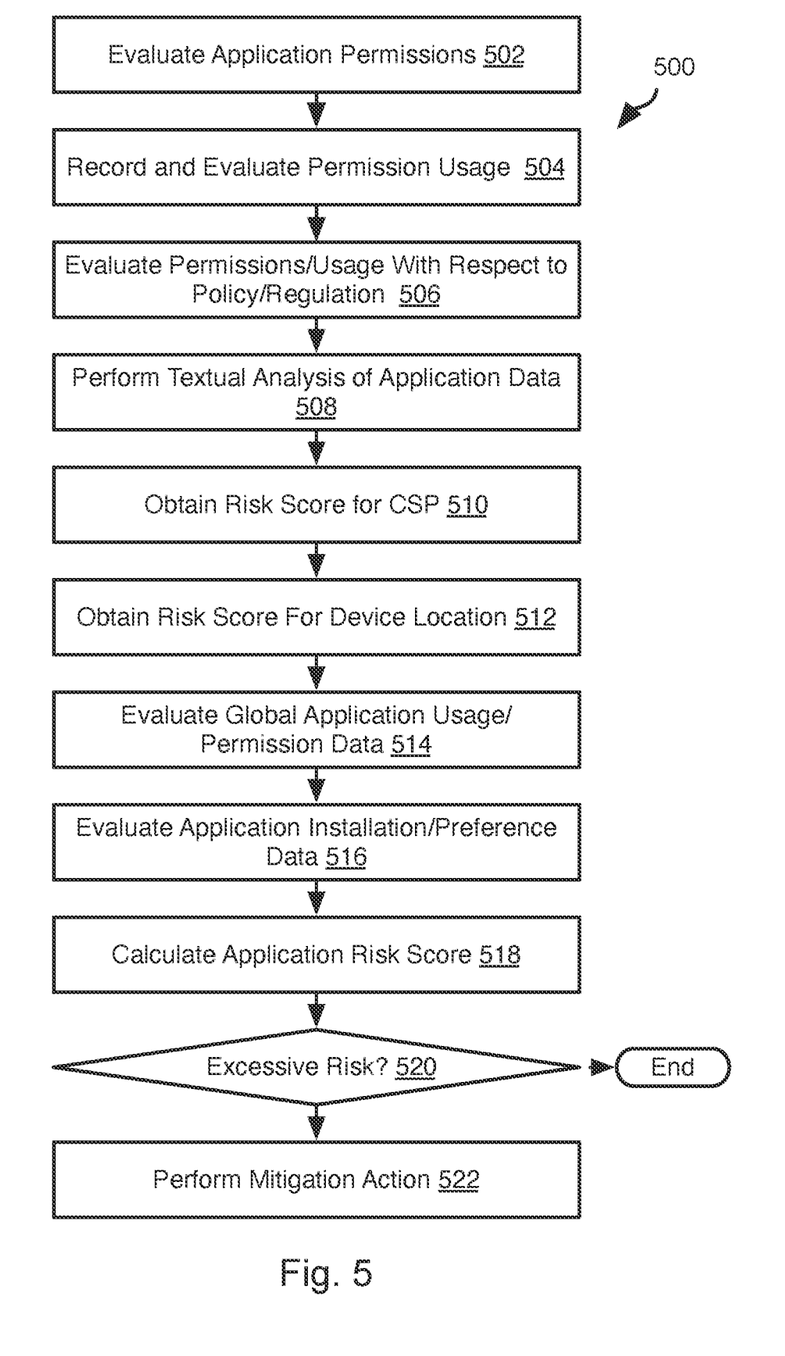
FIG. 5 is a process flow diagram of a method for assigning a security score to an application in accordance with an embodiment of the present invention.

FIG. 5 illustrates a method 500 for assigning a security score to an application ("the application"), which may be an application 214, browser 228, or browser extension 230. The method 500 may be executed by the security module 210 or the server system 102 using information gathered by the security module 210.

The method 500 may include evaluating 502 the application permissions 206 granted to the application. The result of the evaluation 502 may be a score. In the examples, the magnitude of the score indicates a degree of risk with a higher score indicating a higher degree of risk. Accordingly, the score from step 502 may be proportional to, or related according to some other increasing function, to the number of permissions granted to the application. Some permissions may be more sensitive than others such that a more sensitive permission will increase the score more than a less sensitive permission.

The method 500 may include evaluating 504 permission usage by the application, such as some or all of sensors 200 accessed, network interfaces 202 accessed, system functions of the operating system 204 accessed. Permission usage may include the times at which usage occurs and other details of the usage such as a destination (local storage location on the device 104, network address, etc.) for data obtained. The result of the evaluation 504 may be a score. The score from step 504 may be proportional, or related by some other increasing function, to the amount of permission usage by the application. Some permissions may be more sensitive than others such that usage of a more sensitive permission will increase the score more than usage of a less sensitive permission.

The method 500 may include evaluating 506 one or both of the permissions and usage of the application with respect to one or more policies, such as an enterprise policy, government regulation, or other standard of privacy. The result of the evaluation 506 may be a score that increases with a number of violations of the one or more policies. Some permissions may be more important than others such that a violation of one policy will increase the score more than violation of a less important policy.

The method 500 may include performing 508 textual analysis of application data. An application may have configuration files, data repositories, other files, local databases, and the like that may constitute the collected data 218. Performing 508 textual analysis of the application data may include analyzing the collected data 218 to identify references to sensitive information such as sensitive information of the enterprise and/or personal information of the user of the device (e.g., social security number, credit card number, etc.). The result of the textual analysis of step 508 may be a score that increases with a number of items of sensitive data detected. Some items of sensitive data may be more sensitive than others such that detection of a first item of data will increase the score more than detection of a second item of data that is less important.

The method 500 may include obtaining 510 a risk score for a cloud service provider (CSP) used by the application. An application may be a client of a server side application executed by a CSP or may otherwise read data from or write data to storage provided by a CSP. A CSP may have a risk score characterizing counter measures, authentication requirements, history of data breaches, or other aspect of a CSP. The risk score may be determined by a third party and retrieved at step 510. The risk score may increase with increase in risk presented by a CSP. Where the score as received from the third party decreases with increasing risk, the risk score may be the result of inverting the received score.

The method 500 may include obtaining 512 a risk score for a location of the user device 104. Some countries, cities, or other geographic regions may have less secure network infrastructure. The risk score for a location may be assigned by a third party and retrieved as part of the method 500.

The method 500 may include evaluating 514 global application usage and permission data. The application may be an instance of an executable that is installed on many devices of an enterprise or the population in general. The permissions granted for all devices of the enterprise or the population in general may be obtained and characterized. For example, the percentage of device giving the application a given permission may be calculated. The result of step 514 may be a score, such as a sum, or weighted sum, of the percentages for some or all possible permissions that could be granted to the application. The score may be the result of a comparison between permissions granted to the application (see step 502) and the permissions granted on the other devices. For example, for each permission, a difference between whether the permissions is granted on the device 104 (1 if granted 0 if not granted) and the percentage of the other devices that grant the permission. The differences may then be summed to obtain a score such that the score increases to the extent the device 104 grants permissions not frequently granted by other users.

The method 500 may include evaluating 516 the installation of the application and preference data. Evaluating 516 the installation of the application may include evaluating such factors as: how often the application is updated, the APIs 220 used (popularity, risk scores, security safeguards, etc.). The preference data may include whether the application is set to commence execution on startup of the device, which is a source of risk. Each factor considered in the evaluation 516 may be assigned a value corresponding to the degree of risk indicated that factor to obtain a score for the installation and preferences of the application.

The method 500 may include calculating 518 an application risk score. Calculating 518 the application risk score may include summing, weighting and summing, or otherwise combining the scores calculated according to some or all of steps 502 to 516 to obtain the application risk score. In the illustrated example, a higher application score indicates higher risk from the application. However, the opposite approach may also be implemented: the scores for step 502 to 516 may be calculated as a security scores with a higher value indicating a higher degree of security and the score calculated at step 518 being an application security score.

The method 500 may include evaluating 520 whether the application risk score indicates excessive risk, such as being above a threshold. If so, a mitigation action may be performed 522. The mitigation action may include revoking one or more permissions of the application, uninstalling the application, generating a report sent to the server system 102, outputting a notification on the device 104, or other mitigation action.

As discussed in detail below, application permissions may be dynamically managed based on events, such as calendar events. Application permissions often include data sharing permissions. These data sharing permissions may be discovered by, for example, using a machine learning model to process a "terms and conditions" or other documentation outlining data sharing performed by an application. Data sharing permissions obtained using the machine learning model and specified in data sharing permissions granted to an application through operating system may be obtained and presented to the user. The data sharing permissions may be presented in an interface enabling central management of permissions, such as permissions for multiple applications, for multiple users of an enterprise, or other collection of applications, users, and devices. Central management of permissions may include denying permissions across a collection of applications, users, and devices, granting permissions across a collection of applications, users, and devices, or other modification of data sharing permissions. Data sharing permission controls of the operating itself may be used to modify the data sharing permissions. Additionally or alternative, an software developer's kit (SDK) or application programming interface (API) of an application itself may be invoked in order to modify the data sharing permissions.

Figure 6:
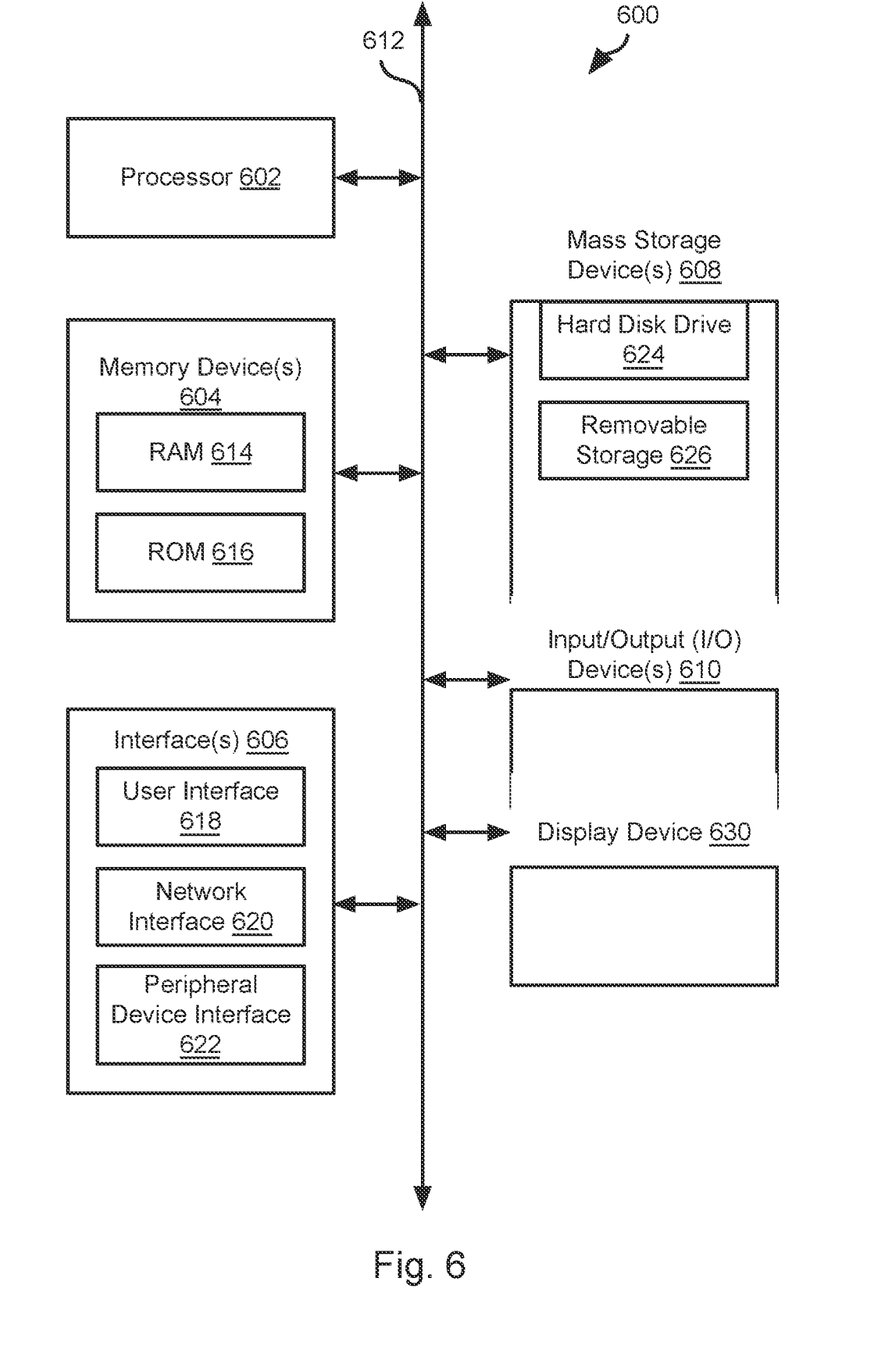
FIG. 6 is a schematic block diagram of a computer system suitable for implementing methods in accordance with embodiments of the present invention.

FIG. 6 is a block diagram illustrating an example computing device 600 which can be used to implement the system and methods disclosed herein. The one or more computers of the server system 102 and the devices 104 may have some or all of the attributes of the computing device 600. In some embodiments, a cluster of computing devices interconnected by a network may be used to implement any one or more components of the invention.

Computing device 600 may be used to perform various procedures, such as those discussed herein. Computing device 600 can function as a server, a client, or any other computing entity. Computing device can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method for managing privacy comprising:
   detecting, by a security module executing on a computing device, an event in a calendar; and
   in response to detecting the event in the calendar, modifying one or more of permissions, configurations, and settings of one or more applications on the computing device;
   wherein modifying the one or more of the permissions, the configurations, and the settings of the one or more applications on the computing device comprises:
   dynamically restricting the permissions of the one or more applications to access one or more sensors of the computing device for a duration of the event in response to detecting the event in the calendar to provide enhancement of privacy during the event; and
   dynamically restoring the permissions of the one or more applications to access one or more sensors of the computing device following the duration of the event in order to remove the enhancement of privacy.

2. The method of claim 1, wherein the one or more sensors comprise at least one of a microphone, a camera, an inertial measurement unit (IMU), global positioning system (GPS) receiver, a near field communication transceiver, fingerprint scanner, and a heart rate sensor.

3. The method of claim 1, wherein modifying the one or more of the permissions, the configurations, and the settings of the one or more applications comprises temporarily modifying the one or more applications.

4. The method of claim 3, wherein temporarily modifying the one or more applications comprises uninstalling and reinstalling the one or more applications.

5. The method of claim 1, further comprising:
   in response to detecting the event in the calendar, disabling sensors in one or more connected devices, the one or more connected devices being connected to the computing device.

6. The method of claim 5, wherein the one or more connected devices include a voice-processing device.

7. The method of claim 5, wherein the one or more connected devices include at least one of a, wireless connected device, BLUETOOTH connected device, or an ultrawideband device.

8. The method of claim 1, wherein detecting the event in the calendar comprises detecting that the event is confidential in response to any of a location of the event and participants of the event.

9. A computer-readable medium storing executable code that, when executed by one or more processing devices, causes the one or more processing devices to:
   detecting, by a security module executing on a computing device, an event in a calendar;
   determining, by the security module, that the event is a confidential event; and
   in response to determining that the event is a confidential event, modifying, by the security module, at least one of permissions, configurations, and settings of one or more applications on the computing device;
   wherein the executable code when executed by the one or more processing devices, further causes the one or more processing devices to modify the one or more of the permissions, the configurations, and the settings of the one or more applications by:
   dynamically restricting the permissions of the one or more applications to access one or more sensors of the computing device for a duration of the event in response to detecting the event in the calendar to provide enhancement of privacy during the event; and
   dynamically restoring the permissions of the one or more applications to access one or more sensors of the computing device following the duration of the event in order to remove the enhancement of privacy.

10. The computer-readable medium of claim 9, wherein the one or more sensors include at least one of a microphone, a camera, an inertial measurement unit (IMU), global positioning system (GPS) receiver, a near field communication transceiver, fingerprint scanner, and a heart rate sensor.

11. The computer-readable medium of claim 9, wherein the executable code when executed by the one or more processing devices, further causes the one or more processing devices to modify the one or more of the permissions, the configurations, and the settings of the one or more applications by temporarily modifying the one or more applications.

12. The computer-readable medium of claim 11, wherein the executable code when executed by the one or more processing devices, further causes the one or more processing devices to temporarily modify the one or more applications by uninstalling and reinstalling the one or more applications.

13. The computer-readable medium of claim 11, wherein the executable code when executed by the one or more processing devices, further causes the one or more processing devices to:
   in response to detecting the event in the calendar, disable sensors in one or more connected devices, the one or more connected devices being connected to the computing device.

14. The computer-readable medium of claim 13, wherein the one or more connected devices include at least one of a wireless connected device, a BLUETOOTH connected device and an ultrawideband device.

15. The computer-readable medium of claim 9, wherein the executable code when executed by the one or more processing devices, further causes the one or more processing devices to detect the event in the calendar by detecting that the event is confidential in response to any of a location of the event and participants of the event.

16. A system comprising:
   one or more processing devices; and
   one or more memory devices operably coupled to the one or more processing devices, the one or more memory devices storing executable code that, when executed by the one or more processing devices, causes the one or more processing devices to:
   detecting, by a security module, an event in a calendar;
   determining, by the security module, that the event is a confidential event; and
   in response to determining that the event is a confidential event, modifying, by the security module, at least one of permissions, configurations, and settings of one or more applications installed on the system;
   wherein the executable code when executed by the one or more processing devices, further causes the one or more processing devices to modify the one or more of the permissions, the configurations, and the settings of the one or more applications by:
dynamically restricting the permissions of the one or more applications to access one or more sensors for a duration of the event in response to detecting the event in the calendar to provide enhancement of privacy during the event; and
dynamically restoring the permissions of the one or more applications following the duration of the event in order to remove the enhancement of privacy.

* * * * *